UNITED STATES PATENT OFFICE.

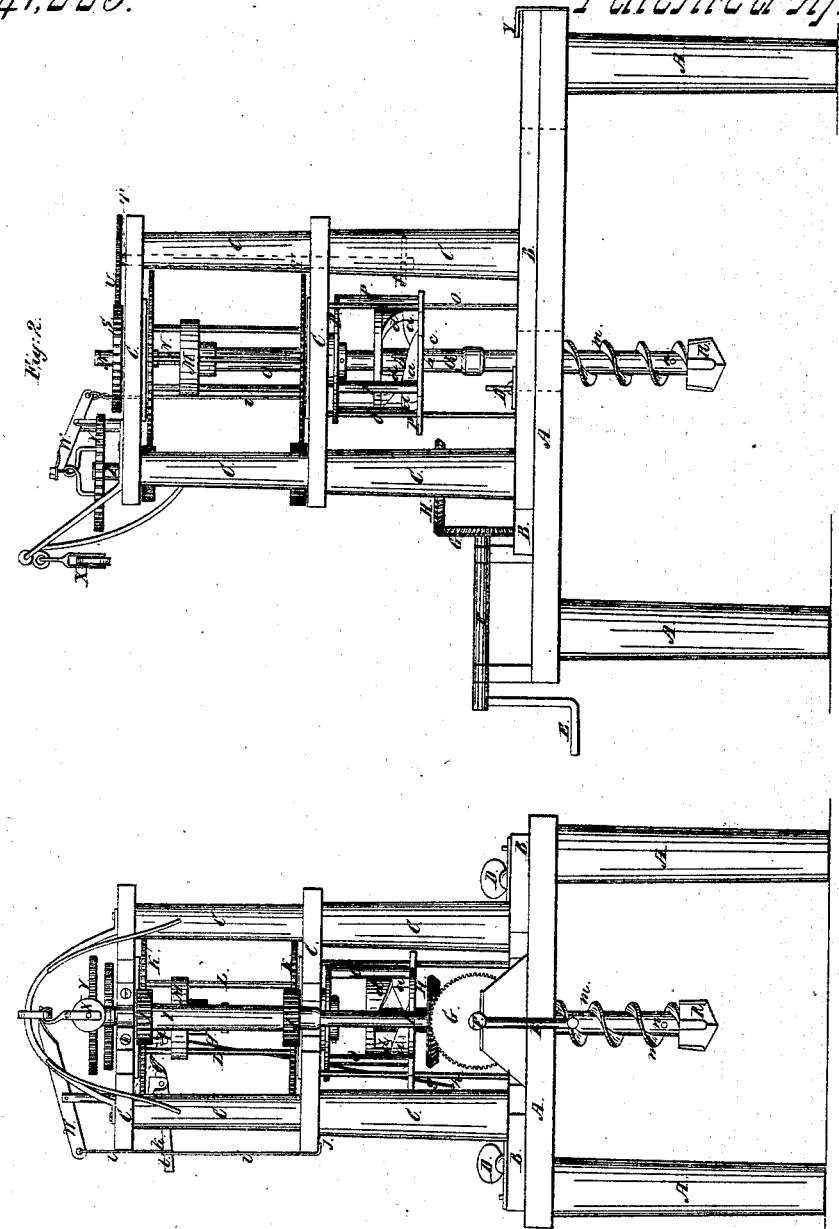

CHARLES A. SAXE, OF PHILADELPHIA, PENNSYLVANIA.

IMPROVED MACHINE FOR BORING WELLS.

Specification forming part of Letters Patent No. 47,225, dated April 11 1865.

*To all whom it may concern:*

Be it known that I, CHARLES A. SAXE, of the city and county of Philadelphia, and State of Pennsylvania, have invented certain new and useful Improvements in a Machine for Boring Wells and other Similar Purposes; and I do hereby declare the following to be a full, clear, and exact description of the same, reference being had to the accompanying drawings, making a part of this specification, in which—

Figure 1 represents an elevation from one of the ends, and Fig. 2 an elevation from one of the sides of the machine.

Similar letters of reference, where they occur in the separate figures, denote like parts in both drawings.

My invention relates, mainly, to an arrangement of machinery by which the power that drives the machine may be continuous and in one direction, while the drill, in connection with its rising and dropping motion, may have a downward-feeding motion and a rotating motion or a rising and falling and a rotating motion, without the feed motion, and in addition thereto the facility of being raised up out of the hole to add a new section to the drill-stock or for repairs, while the power that operates the machine, as above stated, may run at a uniform speed always in one and the same direction.

To enable others skilled in the art to make and use my invention, I will proceed to describe the same, as follows:

A represents a bench, stand, or table having ways B thereon for guiding and directing and holding a frame, C, that carries the mechanism for operating the drill, and whereon it may be adjusted and held by clamps D.

The engine or other first moving-power may be connected to the crank E, and have a continuous motion in one and the same direction. On the crank-shaft F there is a bevel-gear, G, that works in and turns the bevel-gear H on the shaft I and the shaft with it. On the shaft I are placed two pinions, J J', which turn (through the intervention of the gear-wheels K K', that are connected together by the rods L) a screw hub or nut, M, on the screw-shaft N. On the guide-rods O are arranged a frame, P, carrying the cam-planes $a$, this frame being suspended to the shaft or sleeve Q, that carries the screw hub or nut M, and there is suspended to said shaft or sleeve Q the drill or boring-tool R by means of slots $b$ and pins $c$, so that the boring-tool R, while it always rotates with the shaft or sleeve Q, may have a rising and falling motion independent of it, and which motion it receives by its cam-planes $d$ riding upon those, $a$, and dropping down when the planes move past each other.

So long as the screw-shaft N remains stationary and the hub or nut M and its connected parts revolve by the gears, as above described, so long will the boring or drilling tool R continue to be fed downward by said nut and screw; but it is necessary in drilling and boring through harder and softer strata to change or accommodate this feed to the character of stratification. For this purpose I arrange on top of the screw-shaft N a gear-wheel, S, and upon the top of a shaft, T, as shown in red lines, Fig. 2, a gear-wheel, U, that meshes with that, S, on the screw-shaft, and the gear-wheel U and its shaft I can stop or let run as occasion may require, or I can move it by hand to advance or retard the feeding of the drill should the regular feed not be entirely satisfactory or effectual. The gear U and the screw-rod N will turn with the nut M and its connected parts if not checked by any extraneous means, and when so doing there is no feeding down of the drill, and in turning the wheel U will turn the gear S and its shaft T; but when the gear U is stopped, as it may be at any time, by the bolt $e$ shooting into a hole prepared therein for the purpose, it stops the turning of the gear S and of the screw-shaft N, and then the nut M, turning on the screw-shaft, feeds itself and the drill connected to it downward. A hand-lever, I, may be passed through the shaft T, so that the operator can at any time turn the gear U forward or backward or hold it still, either of which has its effect upon the feed motion or the drill to raise or lower or cause it to be passive, as occasion may require. To prevent the spring-bolt $e$ from acting when not required to do so, (its spring being shown in red lines in Fig. 1,) a cord or chain, $g$, fastened to it may be hooked over a pin, $h$, in the frame to hold it back.

On top of the shaft I there is a gear, V, fitted thereto by a feather and slot so as to move, up and down thereon. When the machine is drilling, this gear V is not in action, and is held out of gear by the lever W and cord or chain $i$, hooked to the frame at $j$, and through a loop, $k$, in this cord a lever, $l$, passes, the other end of which lever is moved by the nut M as it rises, and throws the wheel V out of gear. This wheel V, when in gear with the one, S, raises the drill up out of the hole, and when it is up the nut, as above stated, throws it out of action, and the machine is again ready to commence drilling or boring again.

On the drill-shank I make a screw-thread, $m$, for raising the sand, earth, or débris from the drilled or bored hole, and this screw may be encased by a sheet-metal cylinder, if so preferred, to cause it to pump or force up the borings; or the drill-stock may be hollow, and holes $n$ made leading thereto, so as to take the chippings or borings inside, and thus convey them up and out of the hole.

X is a block and tackle for raising up the boring-tool out of the hole when necessary. When this is done, the frame C is run back to the part Y of the table or bench. A rope or chain is then fastened to the boring tool and passed around the shaft F, and the engine does the work of raising.

Having thus fully described my invention, what I claim is—

1. The combination of the drill-frame and the frame that carries the double-cam planes, both suspended to the screw-nut, and arranged to operate substantially as herein described and represented.

2. In combination with a drill or boring-tool that is raised and dropped, rotated and fed up to the work, as herein described, the gear U and its stem or shaft, by which said feed motion may be increased, diminished, or suspended, as and for the purpose set forth.

8. In combination with the raising and dropping, rotating and feeding mechanism, the gear V, and its appliances, for raising the drilling tool and its frame and automatically stopping its action when the drill is up and without stopping the first moving-power, substantially as described.

CHARLES A. SAXE.

Witnesses:
A. B. STOUGHTON,
HAVER. FENDRICH.